United States Patent [19]

Kenworthy et al.

[11] 4,270,020
[45] May 26, 1981

[54] PARTITION WIRING SYSTEM

[75] Inventors: Max H. Kenworthy, Youngstown; Melvin A. Textoris, Struthers, both of Ohio

[73] Assignee: GF Business Equipment, Inc., Youngstown, Ohio

[21] Appl. No.: 96,312

[22] Filed: Nov. 21, 1979

[51] Int. Cl.³ .............................................. H02G 3/00
[52] U.S. Cl. ..................................................... 174/48
[58] Field of Search ................ 174/48, 49; 339/22 R, 339/23; 52/220, 221, 239

[56] References Cited

U.S. PATENT DOCUMENTS

| | | | |
|---|---|---|---|
| 3,461,220 | 8/1969 | Hukin | 174/48 |
| 3,841,042 | 10/1974 | Siegal | 52/239 |
| 4,133,153 | 1/1979 | Hage | 52/220 |
| 4,135,775 | 1/1979 | Driscoll | 339/23 X |

Primary Examiner—Elliot A. Goldberg
Assistant Examiner—D. A. Tone
Attorney, Agent, or Firm—Emory L. Groff, Jr.

[57] ABSTRACT

A wiring system for a partition assembly of a plurality of elevated panels attached to intermediate posts includes electrical assemblies mounted beneath at least a pair of panels. Each electrical assembly includes a fixed length housing provided with an outlet and at least one short flexible conduit extending from one end and a long flexible conduit extending from the other end with the conduits at the two ends of each housing terminating in mating connectors joined to the mating connectors from adjacent panel electrical assemblies. An enclosed raceway is formed by a pair of panel cover plates snap-fitted upon a pair of hanger members attached beneath each panel between the housing and panel edges. The raceway enclosure is completed by post cover plates slidably joined to adjacent panel cover plates beneath each post.

25 Claims, 13 Drawing Figures

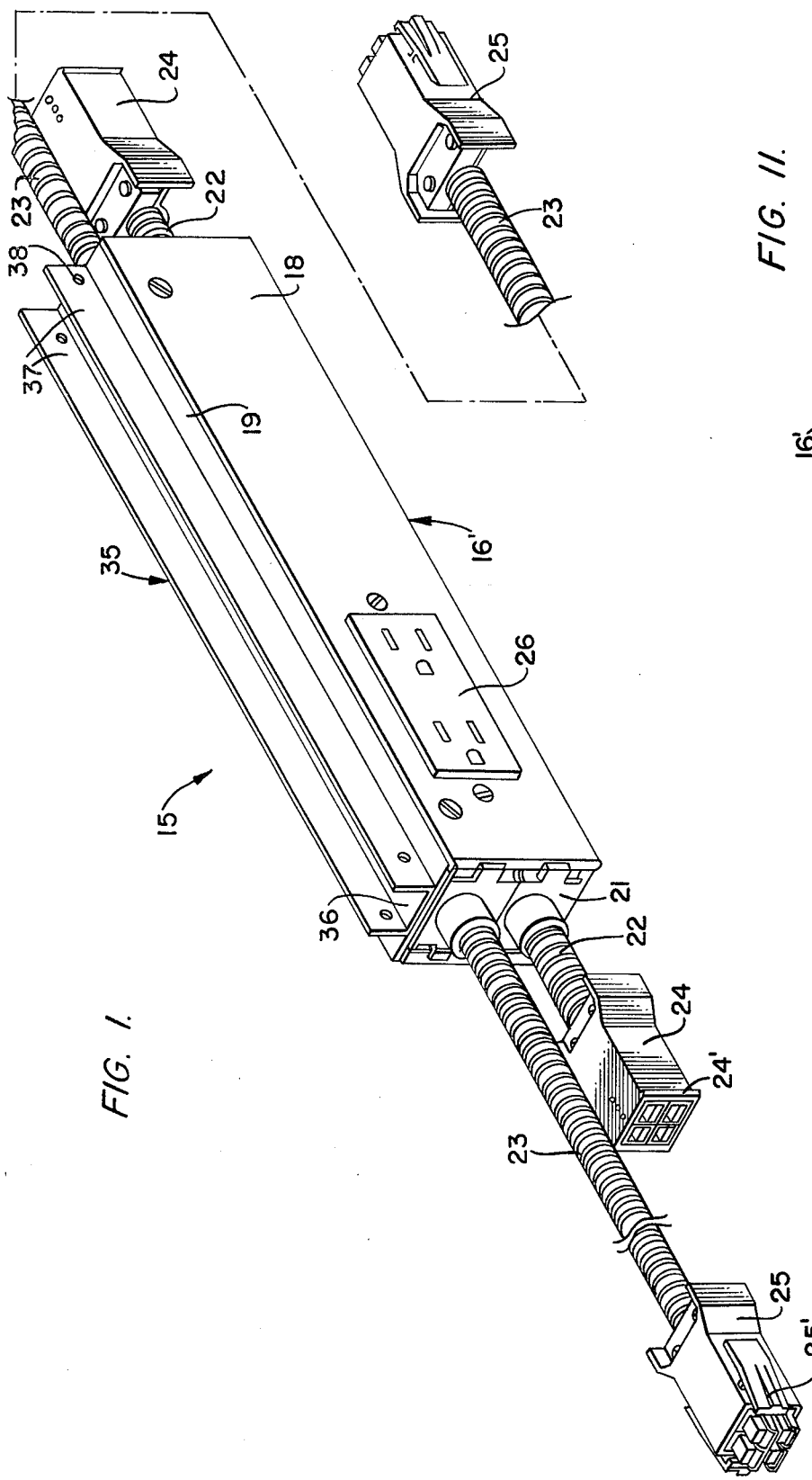
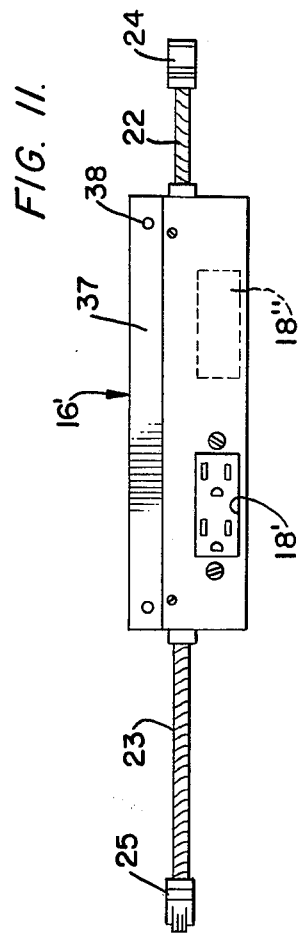
FIG. 1.
FIG. 11.

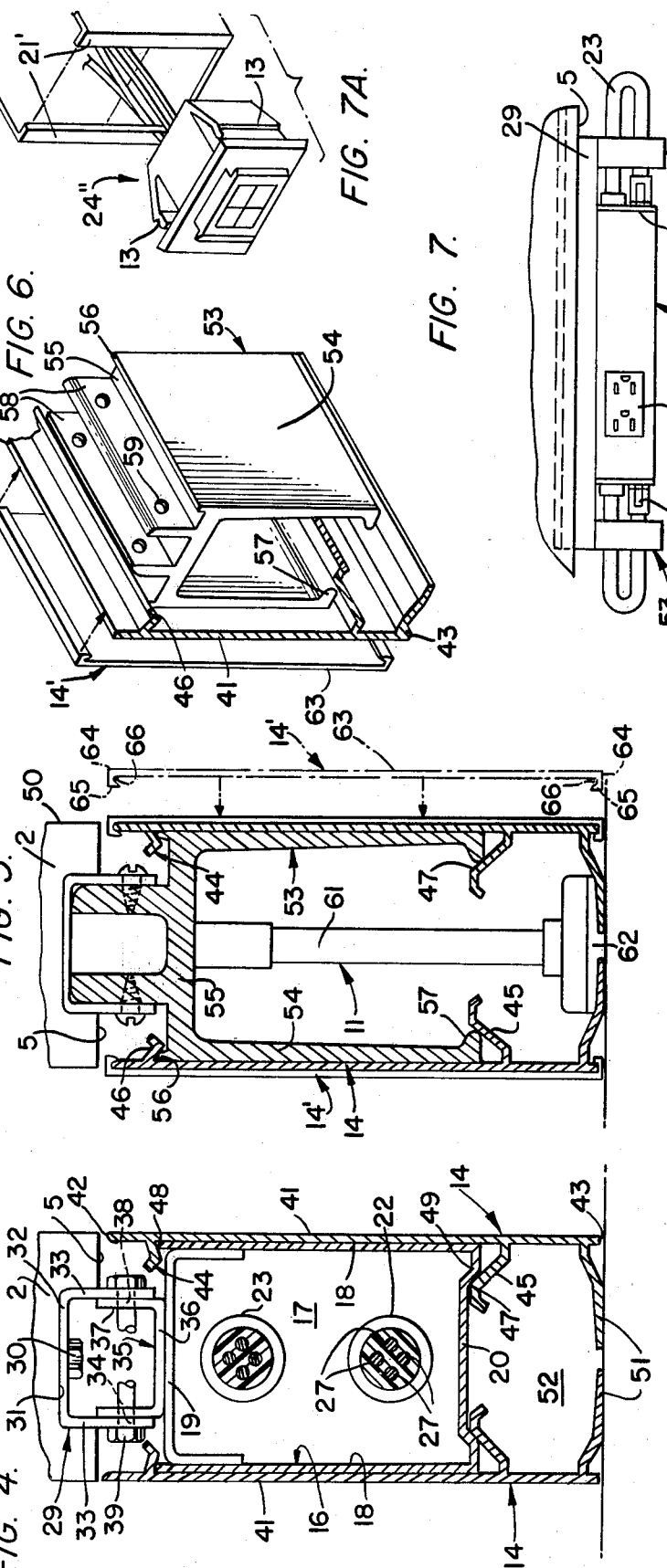

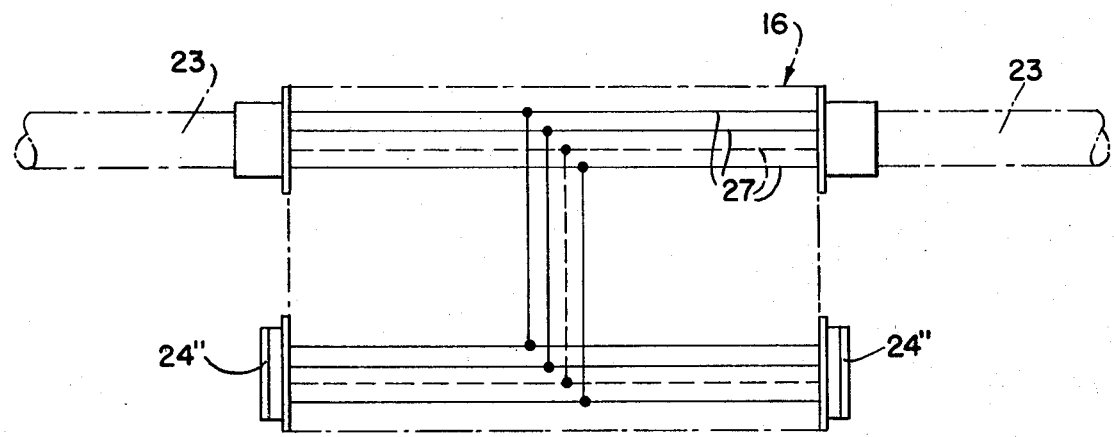
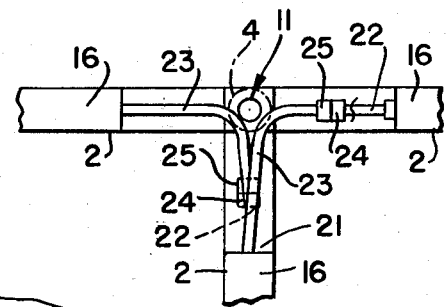
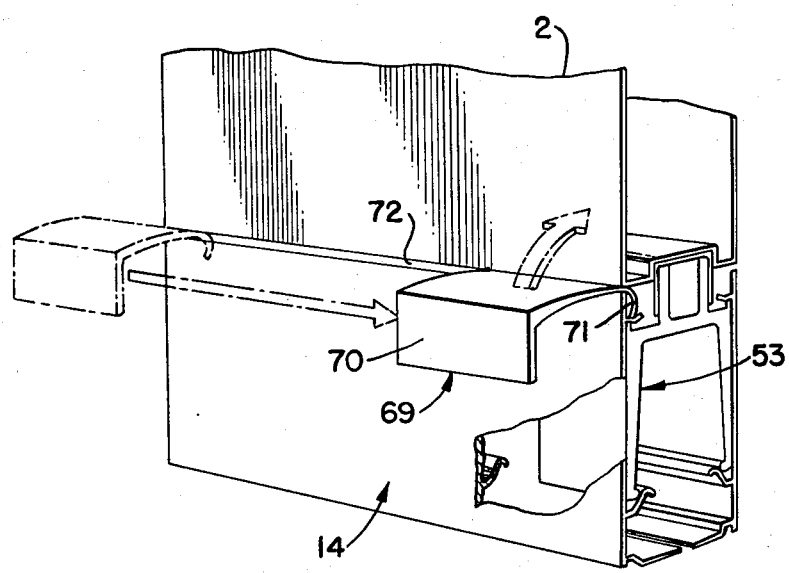
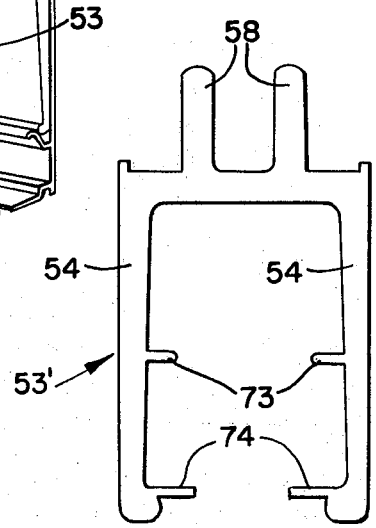

PARTITION WIRING SYSTEM

This invention relates generally, to panels or partitions as employed in the office appliance field to provide for the sub-division of a large enclosure into a plurality of smaller areas, and more particularly, to the provision of an improved wiring system for such partition assemblies offering readily attachable means providing electrical raceways and electrical components associated with each panel and adapted to cooperate with similar elements associated with adjacent panels to provide utility service throughout the extent of the partition assembly.

Several prior efforts have been made to offer convenient means associated with movable or semi-permanently installed partition assemblies to provide for electrical raceways or wiring channels allowing of the distribution of circuits connected to outlets located at various points throughout the running extent of the partition assembly. In many of these earlier instances, extensive modification of the partitions and/or the vertical support posts has been required and often complicated components are utilized which yield an assembly which is expensive to fabricate and install and allows of little or no flexibility in the manner in which electrical service is provided to any or all of the panels in a partition assembly.

By the present arrangement, an improved system is provided comprising a plurality of substantially similar components which may be readily attached to the panels of either a new or an existing, erected partition assembly without the need of any special tools or panel and post modifications. The foregoing is achieved by the provision of an electrical assembly comprising a housing containing one or more lateral or side wall outlets and which is prewired with one or two flexible conduits projecting from each end thereof, which conduits are provided with distal mating connections. This branching electrical assembly is readily affixed to the bottom edge of a partition panel with certain of its attached flexible conduits extending beyond the end edges of the panel.

A wiring enclosure or electrical raceway is formed beneath the elevated bottom of each panel to house the above mentioned electrical components. This enclosure is formed by means of a plurality of panel cover plates each having mounting means engageable with formations on one or more hanger members which may be readily attached to the bottom of each panel at a selected point between the installed electrical housing and the end edges of the panel. The cross-sectional configuration of the electrical housings may alternatively be constructed similar to that of the hanger members such that the cover plates may be snap-fitted thereupon just as in the case of their attachment to the hanger members. Complete enclosure of the electrical raceway area throughout the running extent of the partition assembly is achieved by means of a post cover plate adapted to be removably attached to the terminal edges of two juxtaposed panel cover plates in the area of the intermediate upright support post to which the panels are attached.

The same above described components may be employed to provide a wiring system according to the present invention regardless of the dimensions of the panels being used. It will be appreciated that by employing electrical conduits of appropriate lengths in combination with the fixed-dimensioned electrical housing, it is possible to establish electrical service throughout the running extent of an entire partition assembly. Quite naturally the panel cover plates forming the enclosed raceway beneath each panel will be constructed of a length to completely seal off the running length beneath each respective panel.

Accordingly, one of the objects of the present invention is to provide an improved partition wiring system including a wired electrical housing attached beneath a panel and which cooperates with hanger means for the removable attachment of two panel cover plates enclosing the area beneath the panel to provide an electrical raceway therebeneath.

Another object of the present invention is to provide an improved partition wiring system including a plurality of panels having end edges attached to a supporting post and including continuous electrical service therebeneath provided by means of individual electrical boxes of substantially uniform dimension attached beneath each panel and each having one or two flexible conduits projecting from each end thereof and which mate with similar conduit(s) extending from electrical housings located in the adjacent panels.

Still another object of the present invention is to provide an improved partition wiring system including an electrical housing having a wired outlet and removably attached to the bottom edge of a panel with a pair of removable panel cover plates snap-fittingly attached adjacent each side wall of the electrical housing to enclose the space below the panel and provide an electrical raceway therebeneath with separate post cover plates joining the spaced-apart free ends of the panel cover plates of adjacent panels.

An additional object of the present invention is to provide an improved partition wiring system including a plurality of panels joined by intermediate support posts and having an electrical housing attached to the bottom edge of selected panels and adapted to be enclosed by a pair of removable panel cover plates defining an electrical raceway beneath each panel and which cover plates are removably supported by means of hanger members attached beneath each panel intermediate the electrical housing and panel end edges.

A further object of the present invention is to provide an improved partition wiring system including an electrical assembly attached to each one of a plurality of panels with each assembly comprising a standard dimensioned outlet-equipped housing having connectors located at each end with one or two conduits extending from each end and the lengths of the conduits selected to insure that selected one(s) remain disposed beneath their respective panel while the other conduit(s) are extendable to a point beneath an adjacent panel whereupon at least one conduit at one end of any panel can be connected to one conduit extending from the adjacent panel.

Another object of the present invention is to provide an improved partition wiring system including an electrical assembly removably attached to the bottom of each one of a plurality of elevated panels with each assembly having a housing provided with a short conduit and a long conduit on opposite ends and terminating in mating connectors.

With these and other objects in view which will more readily appear as the nature of the invention is better understood, the invention consists in the novel construction, combination and arrangement of parts hereinafter more fully described, illustrated and claimed.

FIG. 1 is a top perspective view of an electrical assembly according to the present invention;

FIG. 3 is an enlarged horizontal sectional view taken along the line 3—3 of FIG. 2;

FIG. 4 is an enlarged transverse sectional view taken along the line 4—4 of FIG. 2;

FIG. 5 is an enlarged transverse sectional view taken along the line 5—5 of FIG. 2 with the conduits omitted for clarity;

FIG. 6 is a perspective view illustrating one of the hanger members and an attached panel cover plate with a post cover plate shown in an exploded position.

FIG. 7 is a side elevation of a modified electrical assembly for use with panels of minimum width;

FIG. 7A is a fragmentary exploded view illustrating the direct snap-in attachment of a female connector to the lower end of the assembly housing of FIG. 7;

FIG. 8 is a diagrammatic illustration of a typical wiring arrangement within an assembly housing not having a receptacle;

FIG. 9 is a partical perspective view illustrating a procedure for removal of the panel cover plates;

FIG. 10 is a partial top plan illustrating branching of the conduits from one panel to serve more than one adjacent panel;

FIG. 11 is a side elevation of a modification of FIG. 1; and

FIG. 12 is an end elevation of a modification of the hanger member shown in FIG. 5.

Similar reference characters designate corresponding parts throughout the several figures of the drawings.

Figure 2:
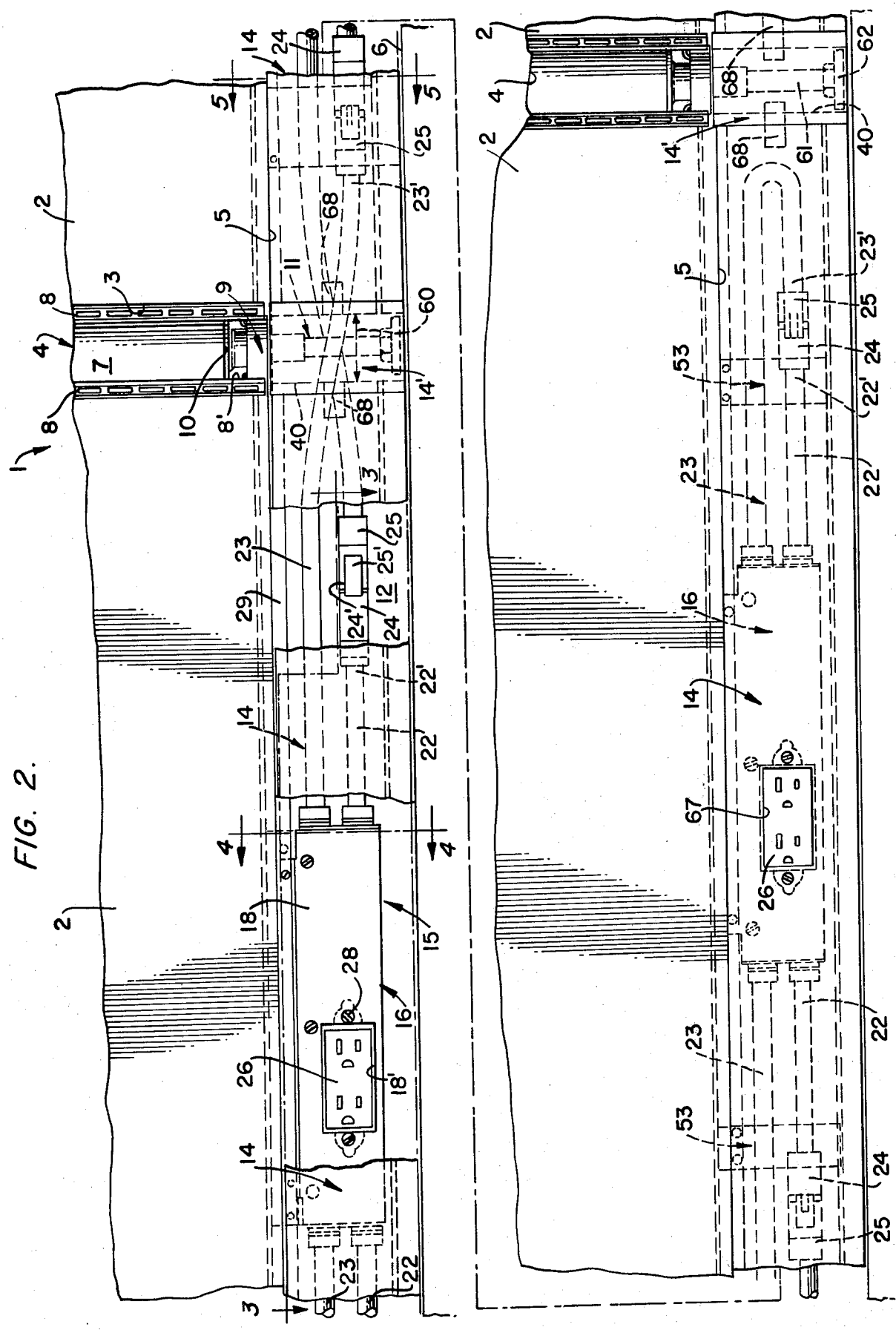
FIG. 2 is a fragmentary side elevation, with portions broken away, of the present partition wiring system.

Referring now to the drawings, particularly FIG. 2, the present invention will be seen to relate to a partition assembly, generally designated 1, including a plurality of panels 2 each having a vertical end edge 3 suitably supported by means of an upright post 4 such that the bottom edge 5 of the panels are rigidly disposed in a position substantially spaced above the underlying floor or support 6.

The standard or post 4 disposed intermediate each pair of adjacent panels 2 may be constructed with either a square or round periphery 7. The attached drawings illustrate a round post 4 which will be understood to allow of variable angular adjustment between adjacent panels and their attached intermediate supporting posts 4. The specific construction of the post employed with the present invention is immaterial as long as adequate means are employed for retaining the panels 2 attached thereto in a fixed manner with their bottom edges 5 elevated above the underlying floor 6, whether the panels are disposed in a straight line, right angular arrangement or any intermediate angular disposition. A well known means for attaching the panels 2 comprises the provision of the edge channels 8 carried by each panel end edge 3 and which is adapted to abut the periphery 7 of the upright post 4 and to be secured thereagainst by appropriate hanger or hook means 8' carried by the upper and lower portions of each edge channel 8. As shown in FIG. 2, the lowermost hook member 8' engages a retainer assembly 9 fixedly attached beneath the post bottom edge 10 and which in turn is supported by means of an adjustable glide assembly, generally designated 11.

The wiring system of the present partition assembly is intended to provide electrical and/or other utility service throughout the running extent or width or all of the panels 2 comprising the partition assembly 1. This system is provided in the space 12 formed between the panel bottom edge 5 and the floor 6, which space becomes an enclosed electrical raceway or wiring enclosure when a plurality of cooperating panel cover plates 14 and post cover plates 14' are subsequently installed.

The present wiring system is principally intended to offer electrical service for the use of occupants situated adjacent either or both sides of any one panel 2 within an entire partition assembly 1 comprising a plurality of connected panels. The principal component providing this electrical service comprises an electrical assembly 15, including a housing or box 16 having a closed interior 17 formed by a pair of side walls 18—18 bounded by a top wall 19, bottom wall 20 and the pair or pairs of opposite end elements or walls 21—21 as shown most clearly in FIGS. 1 and 4 of the drawings.

As is well known in the office appliance art, any one partition assembly 1 often includes panels 2 wherein the running extent or width of the various panels varies. That is, often a three-foot wide panel may be disposed adjacent or intermediate one or two four-foot wide panels, for example. In order to adapt the wiring system of the present invention to partition assemblies incorporating panels of different widths, it has been found most advantageous to employ an electrical housing 16 or 16' having constant length, width and height dimensions regardless of the width of the panel 2 to which the housing is to be connected. The adaptability of such a fixed dimensioned housing 16,16' to panels of different widths is achieved by combining the standard-dimensioned housing 16 with prewired flexible conduits of different lengths. This variation of conduit lengths will be discussed in more detail hereinafter.

As shown most clearly in FIGS. 1 and 2 of the drawings, each electrical assembly 15 is intended to be mounted beneath the medial portion of each panel 2 and preferably includes an electrical housing 16 having a first flexible conduit 22 and a second flexible conduit 23 axially extending from each of the two housing end walls 21—21. Each first conduit 22 may be referred to as a short conducting element, that is, its distal portion 22' is disposed well within the confines of the space 12 beneath its own associated panel 2 while each second conduit 23 may be referred to as a long conducting conduit, with its distal portion 23' extending well beyond the end edge 3 of its associated panel 2. The exposed ends of each of the four conduits projecting from any one electrical housing 16 are provided with appropriate electrical connectors selected to enable a mating connection between a first conduit 22 of one electrical housing 16 and a second conduit 23 of another adjacent electrical housing 16 as will become obvious hereinafter. In this respect, each first conduit 22 may be provided with a female connector 24 while each one of the second conduits 23 is provided with a male connector 25. Appropriate lock means are included on the connectors to insure a positive retention of any joined pair of mating connectors. As shown in FIG. 1, each male connector is provided with catches 25' adapted to cooperate with shoulders or keepers 24' on each female connector.

One side wall 18 of the electrical housing 16 is provided with an opening 18' and the other side wall is provided with a knock-out 18" to allow for the reception of either one or two electrical duplex outlets or receptacles 26. In this manner, the customer may specify whether or not an outlet 26 is desired on one or both sides of each one of the panels 2 of the partition assembly 1. Prior to installation of the wiring system the appropriate knock-outs are removed and an outlet 26 is mounted through the thus-provided cut-out 18' in each selected side wall 18 and the receptacle is secured by means of appropriate fasteners 28. Regardless of the number of outlets 26 associated with each electrical housing 16, it will be understood that usually every one of the housings is provided with the aforedescribed two pairs of conduits 22-23 for reasons which will become apparent later in this description. All of the conduits are preferably equipped with four wires 27 that is, two hot wires, a common wire and a ground wire whereby a parallel wiring arrangement may be provided including all conduits and outlets in every electrical housing 16 regardless of the number of outlets in any one housing. Thus, in view of the four conductors or wires contained in each conduit, two circuits are provided and all of the outlets in any housing may be hot wired with respect to both circuits as supplied by any one of the four conduits associated with that electrical housing 16.

The ease of assembly of the present wiring system is a noteworthy advantage and may be readily accomplished by non-skilled personnel either during the initial erection of the partition assembly or at some time thereafter. The entire wiring system is intended to be supported by the bottom edge 5 of the respective panels 2 and this is accomplished by means of an appropriate panel bottom channel 29 suitably affixed, such as by means of a plurality of screws 30, within a recess 31 formed in the panel bottom edge 5 as shown most clearly in FIG. 4 of the drawings. This bottom channel 29 preferably includes a base 32 from which depend a pair of flanges 33—33 each having at least a pair of openings 34 therethrough adjacent the medial point of the panel bottom. The hanging or attachment of one electrical assembly 15 beneath the medial portion of each panel 2 is achieved through mounting means 35 provided on the top wall 19 of each housing 16. This mounting means 35 preferably includes an upright channel having a base 36 and a pair of upstanding flanges 37—37 which are spaced apart a distance intended to provide a close mating fit with the two depending flanges 33—33 of the panel bottom channel 29. With the foregoing structure in mind, it will be appreciated that the electrical housing 16 may be quickly attached beneath a panel 2 by aligning openings 38 formed in the mounting means 35 with the openings 34 of the bottom channel 29 and then applying therethrough appropriate fasteners 39, such as sheet-metal screws.

Following the mounting of the electrical housings 16 beneath each one of the panels 2 of the partition assembly 1, the first flexible conduit 22 projecting from the end wall 21 of each housing 16 is connected to the second flexible conduit 23 of the next adjacent electrical housing 16 by means of their mating connectors 24-25, as shown in the upper portion of FIG. 2 of the drawings and this interconnection of juxtaposed long and short conduits from adjacent electrical assemblies 15 continues until all housings are thusly joined. As previously mentioned, the length of the respective conduits 22-23 associated with each housing 16 is determined by the running extent or width of its associated panel 2 and accordingly, it will be appreciated that in order to insure joining of the adjacent short and long conduits 22 and 23 respectively of each adjacent electrical assembly 15 regardless of the associated panel width, it will follow that longer conduits 22 and 23 will be required when mounted upon panels of greater width. Thus, by selecting the appropriate conduit lengths according to the associated panel widths, the installer is assured of achieving the arrangement as shown in the upper portion of FIG. 2 wherein none of the conduits are excessively stretched nor is there extraordinary slack in the conduits between adjacent electrical housings 16. Additionally, there is no chance of improperly joining the various conduits and connections since a short female conduit 22 is always joined to a long male conduit 23 from another housing 16 with a mating pair of the connectors 24-25 loacted to either side of an intermediate partition assembly post 4. Thus, all of the short conduits 22 are provided with but one type of connector, such as the illustrated female connectors 24 while all long conduits 23 are equipped with male connectors 25 having appropriate locking means such as the previously described catches 25' adapted to retain each joined pair of conduits 24-25.

The electrical assembly 15 shown in the lower portion of FIG. 2 will be seen to illustrate an alternate arrangement wherein the right-hand pair of conduits 22,23 are connected to one another by looping the longer conduit 23 back toward the adjacent short conduit 22 carried by the same end of the housing. Such disposition may occur at the end-most panel 2 of a partition assembly 1 or at least, at the terminal housing 16 in a series of electrical assemblies 15. In this manner, it will be seen that means are provided to insure there are no loose conduits or exposed connectors at any point in the system not even at the end of a series of assemblies 15. Exceptions to the above naturally may occur yet it will be appreciated that the concept of the instant invention provides means to "tie-off" the end-most housing conduits.

A clean uncluttered raceway 12 is maintained by the proper selection of conduit lengths for the electrical assembly 15 associated with each panel 2. As will be most evident from the upper portion of FIG. 2 of the drawings and considering the two conduits 22-23 projecting to the right of the housing 16, the distal portion of the connector 24 is disposed approximately the same distance short of the nearest glide assembly 11 as the distal portion of the connector 25 is disposed beyond that same glide assembly. This same equal spacing is maintained between each pair of adjacent panels 2, regardless of the width of the panels, by providing electrical assemblies 15 having conduits 22-23 of appropriate lengths to insure this same and equal spacing so that by mounting all of the housing 16 in the center of each panel bottom channel 29, this relationship is maintained.

Having now described the manner of attaching the electrical housings 16 and their associated conduits 22 and 23 within the space 12, it will be appropriate to proceed with a description of the application of the panel cover plates 14 and post cover plates 14' which provide the substantially fully enclosed electrical raceway containing the inter-connected electrical assemblies 15. The panel cover plate 14 comprises a longitudinally extending member having a length substantially equivalent to the overall width of its respective panel 2. As shown in FIG. 2 of the drawings, the ends 40 of each panel cover plate 14 extend to a point approximately vertically aligned with the exposed portion of the panel edge channel 8. The specific construction of each cover plate 14 is shown most clearly in FIGS. 4, 5 and 6 of the drawings, wherein it will be seen that each plate in- cludes a vertical wall 41 having a top edge 42 extending to a point substantially juxtaposed the panel bottom edge 5 and a bottom edge 43 extending substantially to the floor or support 6.

Each panel cover plate 14 is provided with means appropriately extending throughout its length for removably snap-fitting or otherwise attaching the plate to the balance of the system with its inner surface juxtaposed one of the side walls 18 of the housing 16. This attachment means comprises inwardly directed upper and lower arms 44 and 45, respectively. The inwardly directed upper arm 44 includes a downwardly facing hook or shoulder portion 46 while the inwardly directed lower arm 45 is provided with a deflectable upwardly facing bearing edge 47. These described components of the panel cover plate 14 are adapted to cooperate with appropriate retention means either associated with each side wall 18 of the electrical housings 16 and/or comprising separate members as will be described hereinafter. As shown in the housing embodiment of FIG. 4 of the drawings, the upper edge 48 of the housing side wall 18 extends slightly above the plane of the top wall 19 while a bottom edge formation 49 projects downwardly from the housing bottom wall 20 adjacent its connection with the side walls 18.

With the foregoing structure in mind, it will be appreciated that after the panel upper arm 44 is placed over the electrical housing side wall upper edge 48, the longer lower arm 45 may be swung inwardly with its deflectable edge 47 snap-fitting behind the bottom edge formation 49 with the result that the cover plate 14 will be firmly retained in the position shown in FIG. 4 of the drawings. When both panel cover plates 14—14 have been installed beneath any one panel 2 it will be seen that a substantially smooth and continuous surface is provided from the uppermost portion of the panel, downwardly past its bottom edge 5 to the underlying floor or support 6 and this continuity is enhanced by forming the dimensions of the electrical housing 16 such that when the cover plates 14 are attached thereto the outer surface of the vertical walls 41 will be co-planar with the surface of the panel outer faces 50. The lower portion of each cover plate 14 includes an inwardly directed foot plate 51 extending from adjacent the bottom edge 43 to a point just short of the center line of the panel. Upon the attachment of both cover plates 14—14 beneath each panel 2 it will be seen that a lower cavity 52 is provided within the raceway 12 beneath the electrical housing 16, which cavity may be employed to contain other utility conduits such as communications wiring.

Alternate, or if desired, supplemental means are provided to support each panel cover plate 14. By alternate it is meant that the elevated electrical housing side wall upper edge 48 and the bottom edge formation 49 may be dispensed with by providing a strictly rectangular electrical housing 16', as in FIGS. 1 and 11, in which case, alternate support means in the form of the illustrated hanger member 53 will be provided. On the other hand, the hanger member 53 may be employed to supplement the support means shown in FIG. 4 of the drawings, especially in the case of the larger sized panels which quite obviously would require additional support for the distal portion of each panel cover plate 14, especially in the areas adjacent the respective ends 40 of the cover plates. In either case, it is proposed that one or more of the hanger members 53 be installed beneath most panels 2 on either side of its respective electrical housing 16 as shown in FIGS. 2 and 7 of the drawings.

The most important aspect of the hanger member 53 is that its exterior configuration is substantially identical to that as defined by the cross section of the electrical housing 16 as shown in FIG. 4. In this respect, each hanger member includes a pair of spaced apart side walls 54—54 joined by means of a transverse top wall 55 with each side wall having an elevated upper edge 56 and a lowermost bottom edge formation 57. Projecting upwardly from the top wall 55 are mounting means in the form of a pair of upstanding flanges 58—58, each provided with at least one opening 59 by means of which the hanger member 53 is readily affixed to the same panel bottom channel 29 serving to support the electrical housing 16. From a review of FIGS. 4 and 5 of the drawings, it will be readily appreciated that the substantially congruent exterior configuration of the sides of the hanger member 53 and electrical housing 16 enables the removable attachment of the panel cover plate 14 to either or both of the two members 16,53 and by means of the same upper arm 44 and lower arm 45. Preferably, in all panel installations utilizing either type of electrical assembly 16,16' employing a pair of conduits 22,23 on both ends, at least one hanger member 53 is attached to the bottom channel 29 at a point corresponding to the location of the female connector 24 of each short conduit 22 as shown in FIG. 2.

The housing 16' of FIG. 1 is similar to the housing 16 except the former lacks the formations 48,49 and is used in most installations with at least a pair of hanger members providing the supporting means for the panel cover plates on each panel. In either case housing end walls 21 may be seen. As seen in FIG. 3, the end walls are provided with a staggered edge formation allowing of the slidable attachment of individual end wall sections to the housing side walls 18—18.

FIG. 7 illustrates an electrical assembly, as would be used with a minimum width panel. In such an installation only a pair of long conduits 23 are used and a pair of female connectors 24"-24" are mounted directly upon the ends of the housing. As shown in FIG. 7A, the ends of the housing side walls 18 may each be provided with an inturned flange 21' adapted to serve as catch means engageable with resilient shoulders 13 on the female connectors 24". In this manner male connectors 25 from either adjacent assemblies, or from the same assembly can be joined to the housing connectors 24". FIG. 7 depicts a preferred manner of handling and storing individual electrical assemblies of this type so that there are no loose or dangling conduits while FIG. 8 illustrates a typical wiring diagram for such an assembly without showing the obvious connections that would be made if a receptacle 26 were shown in this view.

As previously noted, it may be desirable to employ only one pair of conduits on each assembly. FIG. 11 shows just such an arrangement with a long and short conduit 23 and 22 extending respectively from the two ends of the housing. Just as in the system shown in FIG. 2 of the drawings, the single long and short conduits 23,22 cooperate with short and long conduits respectively, contained in electrical assemblies mounted upon adjacent panels. Thus, the long conduit 23 will extend into the next adjacent panel area substantially the same distance as the short conduit 22 is away from the next adjacent panel area.

As previously mentioned, the opposite ends 40—40 of each panel cover plate 14 preferably terminate at a point substantially vertically aligned with the exposed edge of each panel edge channel 8, which arrangement will be seen to leave a space 60 between adjacent panel cover plates 14—14 in the area of each glide assembly 11. Terminating the ends 40 of each panel cover cover plate 14 at the edge of each panel channel 8 accomplishes two purposes. First, it allows of the angular disposition between any two adjacent panels 2 with respect to their intermediate supporting post 4 without interference from the installed cover plates and secondly, it permits servicing or adjustment of individual glide assemblies 11 at any time without the necessity of disassembling existing, installed cover plates 14.

The above latter mentioned situation permits accessibility to the glide assembly screw shaft 61 and glide 62 should it be necessary to adjust their vertical relationship with respect to the attached retainer assembly 9 in order to accommodate an uneven condition in the underlying floor 6, for example. In the case of a partition assembly 1 wherein two adjacent panels 2 are disposed in a longitudinally aligned disposition, the space 60 between the respective panel cover plates 14—14 is readily enclosed by the application of one of the post cover plates 14' on either side of the assembly. Each such post cover plate 14' is of a running length greater than the aforedescribed space 60 as will be readily appreciated from a review of FIG. 2 of the drawings. This cover plate 14' comprises a vertical wall 63 of sufficient height to completely overlie and mask the vertical extent of the panel cover plates 14.

Mounting means are provided along both the top and bottom edges of the post cover plate 14' in the form of rearwardly directed flanges 64 each terminating in an inwardly directed hook 65 thereby providing an internal groove 66 constructed to provide a tight sliding fit about the exposed top edge 42 and bottom edge 43 of the underlying panel cover plates 14—14. Depending upon the thickness and composition of the material employed to fabricate the post cover plates 14' it will be obvious that the flanges 64—64 thereof may either be alternately snap-fitted over the respective top and bottom edges of the panel cover plates 14—14 or alternatively, the two grooves 66 of each post cover plate may be initially engaged with the top and bottom edges 42-43 of a first one cover plate 14 and subsequently longitudinally shifted until these grooves 66 engage the top and bottom edges of the other one of the adjacent panel cover plates 14.

The panel cover plates 14 are additionally provided with a knock-out properly positioned to overlie an outlet 26 which may be supplied by an underlying electrical housing 16. If the customer has specified an outlet 26 on a particular side of a specific panel 2, then the mounted housing 16 will be so equipped with an outlet on that side wall 18 and the juxtaposed cover plate knock-out will be removed to provide an outlet opening 67 as shown in the lower portion of FIG. 2. With the foregoing in mind, it will be readily appreciated that the utmost adaptability will be achieved by providing for the mounting of the two outlets 26—26 in each housing 16 such that they are longitudinally spaced an equal distance from the center of the housing as shown in FIG. 3 of the drawings. In this manner, only a single outlet knock-out is provided in a single panel cover plate 14 adapted to be attached to either side of any one panel.

FIG. 2 also illustrates the provision of a knock-out 68 formed at each end of the panel cover plates 14 such that upon removal of same an opening is provided which communicates with the panel end edge 40 and is normally partially masked by the installed post cover plate 14'. These openings allow for the ready entrance of a power supply cord leading to a selected one of the assemblies 15 as well as communications wiring (not shown).

If any panel in a partition assembly is not to be equipped with at least one outlet 26 then quite obviously an electrical assembly 15 would not be required in the space 12 beneath that panel. In such instances continuity of current is maintained by employing pass-through cables or conduits (not shown) to inter-connect the short and long conduits 22-23 from the adjacent panels. Such pass-through conduits should be provided with the same mating connections 24-25 for obvious reasons.

FIG. 9 of the drawings illustrates suggested means facilitating the selected removal of any one of the cover plates 14 and will be seen to disclose a hand removal tool 69 including a handle portion 70 joined to the nose portion 71. The nose portion 71 preferably is of a thickness readily allowing its insertion and subsequent longitudinal displacement within the slot 72 formed between the cover plate top edge 42 and the bottom edge 5 of the adjacent panel. As shown in the right hand portion of FIG. 9, the curved distal portion of the tool nose portion 71 is adapted to engage and apply leverage above the hook shoulder portion 46 of the installed cover plate 14 with the tool disposed substantially horizontally as shown. When pivoted upwardly as indicated by the arrow in this figure of the drawings, the camming action produced by the nose portion bearing against the stationary panel bottom 5 will be understood to pull the top of the cover plate 14 away from its engagement with the hanger member side wall upper edge 56 thereby achieving a disconnection of the snap-fitted relationship previously retaining the cover plate in position.

One of the advantages of utilizing an electrical assembly having two pairs of long and short conduits as shown in FIGS. 1 and 2 of the drawings, as opposed to employing the alternative electrical assembly of FIG. 11 which only includes a single long and short conduit, is the ability to provide branching circuits in a partition assembly including three or more panels 2 intersecting at a single supporting post 4 such as shown in FIG. 10 of the drawings. In this example three separate panels 2 are joined at right angles to the single upright or post 4 and the electrical assembly 15 provided in the lower central panel will be seen to include both a long and short conduit 23,22 projecting from the illustrated end wall 21 of the housing. The long conduit 23 branches outwardly toward the right-hand most panel at the point of intersection of the panels and is joined to a short conduit 22 extending from the electrical assembly contained in that panel. At the same time the short conduit 22 contained in the lower central panel is connected to the long conduit 23 branching from the left-hand panel. The two lateral panels 2,2 in this modification each may be provided with either a single or two pairs of conduits. In the illustrated view, these latter electrical assemblies each contain but a single pair of conduits and it will be understood that if the second pair were included then these latter would be joined directly to one another and if a fourth panel were joined to the three illustrated panels then these latter pair of conduits would obviously be joined to two mating conduits extending from the electrical assembly which would be installed in that fourth panel. In all instances, it will be understood that appropriate lengths of long and short conduits are provided and have mating connectors permitting joining with opposite/length conduits from one or more adjacent panels thereby precluding any loose, unattached conduits.

FIG. 12 illustrates a modified hanger member 53' having the same exterior configuration as the hanger member 53 but which is provided with retainer means carried by the interior of each of the side walls 54. This retainer means includes a pair of inwardly directed legs 73—74 extending toward the opposite side wall to restrict the lateral space between the lower portion of the two side walls 54 a degree sufficient to preclude the fall of a female connector 24 therethrough. The space between the opposed lower legs 74—74 is restrictive enough also to prevent a flexible conduit 23 from falling downwardly therethrough while the upper legs 73—73 are vertically spaced from the lower legs a sufficient distance to allow a close longitudinal sliding fit when a connector 24 is inserted therebetween. In this manner the short conduit 22 of any assembly 15 will be supported by the retainer legs engaging the conduit's female connector 24. This support feature is especially appreciated during installation of each assembly 15 when the short flexible conduits 22 would otherwise tend to dangle below the hanger members 53 before being attached to a long conduit 23 of the next installed assembly 15. And additionally, even after completing an installation, the use of the hanger members 53' will be understood to assist in supporting joined conduits, particularly in a partition assembly including panels 2 of greater widths. Additionally it will be appreciated that when pass-through cables or conduits are used beneath a panel not intended to be provided with an electrical assembly 15, the use of hanger members 53' will provide support means for these cables.

The retainer legs 73-74 shown in the hanger member 53' are preferably formed as integral extensions of the side walls 54. However, quite obviously the retainer legs can be separate elements suitably affixed to the hanger member side walls (not shown).

Although not illustrated in the drawings, it will be understood that appropriate power supply means such as an entrance cable or conduit, will be employed to introduce power to the partition assembly and is joined to the wiring system by means of a mating connection.

From the foregoing description it will be seen that an improved partition wiring system is presented wherein standardized electrical housings are provided with branching conduits of differing lengths projecting from each end with each pair of conduits adapted to be joined with mating conduits projecting from one or more electrical housings in one or more adjacent panels such that loose or dangling conduits are substantially eliminated.

We claim:

1. A wiring system for a partition assembly having a plurality of elevated panels provided with end edges attached to intermediate upright means including, an electrical assembly associated with at least two adjacent said panels, each said electrical assembly including a housing mounted beneath one said panel, each said housing provided with opposed side walls and end walls, an exposed outlet mounted through at least one said side wall, each said housing including a short flexible conduit extending from one end wall and a long flexible conduit extending from the other end wall, said short conduits extendable to points short of the juxtaposed said intermediate upright means a distance substantially equal to the distance said long conduit connectors are extendable beyond their juxtaposed said intermediate upright means, said conduits on each said housing terminating in mating connectors, opposed conduits of adjacent said housings having mating connectors joined to said conduit connectors of the adjacent said housings, hanger means mounted beneath said panels, and separate removable cover means attachable to said hanger means on each side of said panels to provide an enclosed raceway beneath said panels containing said electrical assemblies whereby, when all said mating conduit connectors are joined said conduits are substantially fully extended.

2. A wiring system according to claim 1 wherein, at least one said housing includes a pair of conduits extending from each said end wall and each said pair including a long conduit and a short conduit.

3. A wiring system according to claim 2 wherein, at least one said long conduit of said pair of long and short conduits extending from one said housing end wall is bendable 180° to allow joining of its connector with said mating connector of said short conduit of said same pair of long and short conduits.

4. A wiring system according to claim 1 including, a glide assembly supporting each said upright means elevated above a support surface and said conduits joined between adjacent said panels pass between said glide assembly and said cover means.

5. A wiring system according to claim 1 wherein, at least two adjacent said panels are of varying width, all said housings in said system of a fixed longitudinal extent and said conduits of said varying width panel electrical assemblies are of varying lengths.

6. A wiring system according to claim 5 wherein, all said housings are mounted beneath the mid point of their respective panels.

7. A wiring system according to claim 1 wherein, all said conduits projecting from each said housing are electrically wired to all said outlets mounted on each said housing.

8. A wiring system according to claim 7 wherein, each said conduit includes four conductors providing two circuits to each said housing.

9. A wiring system according to claim 1 wherein, each said outlet projects outwardly from its mounted housing side wall, said cover means including a panel cover plate having a knock-out removable to surround said projecting outlet when said cover plate is attached to said hanger means.

10. A wiring system according to claim 1 wherein, said hanger means includes a separate hanger member intermediate each housing end wall and panel end edge.

11. A wiring system according to claim 10 wherein, said housing includes a pair of conduits extending from each said end wall, each said pair including a long conduit and a short conduit, said short conduits extended to points beneath their respective panels and said long conduits extended past an adjacent upright means to points beneath adjacent panels, and said hanger members are mounted at points juxtaposed said short conduit connectors.

12. A wiring system according to claim 11 wherein, said hanger members include a pair of depending spaced apart side walls between which said conduits are extendable, and retainer means adjacent the lower portion of said hanger member side walls operable to support one said conduit connector thereupon.

13. A wiring system according to claim 1 wherein, said hanger means includes formations on said housing engageable with said cover means.

14. A wiring system according to claim 1 including, an inverted channel attached to the bottom of each said panel and upstanding flanges on both said housings and said hanger means attachable to said channel to provide said mounting thereupon.

15. A wiring system according to claim 1 wherein, said hanger means includes a hanger member having depending side walls defining a cross-sectional profile substantially similar to that of said housing side walls.

16. A wiring system according to claim 15 including, edge formations on the top and bottom of said hanger member side walls, said cover means including a panel cover plate having an inwardly directed upper hook portion and lower arm engageable with said top and bottom edge formations.

17. A wiring system according to claim 1 wherein, said cover means includes panel cover plates each having a vertical wall engaging one said housing side wall and said hanger means and said vertical wall presents an outer surface co-planar with the above disposed outer surface of said panel.

18. A wiring system according to claim 1 wherein, said cover means includes a panel cover plate having a running length extending substantially the distance between two adjacent said upright means, and a post cover plate overlapping and slidably mounted upon adjacent panel cover plates.

19. A wiring system according to claim 18 wherein, said panel cover plate includes an inwardly directed foot plate extending substantially one-half the thickness of said panels.

20. A wiring system according to claim 18 wherein, said cover plate includes an elongated knock-out communicating with each end thereof.

21. A wiring system according to claim 1 wherein, at least one said housing includes end walls having means removably attaching said conduits thereto.

22. A wiring system according to claim 21 wherein, said attaching means includes inturned flanges at the ends of said housing side walls.

23. A wiring system according to claim 1 wherein, at least one said housing includes end walls each having one said connector-equipped conduit extending therefrom and a connector directly attached to each said housing end wall adjacent said connector-equipped conduit.

24. A wiring system according to claim 23 wherein, said connector-equipped conduit and directly attached connector are removably attached to said housing end walls.

25. A wiring system according to claim 1 wherein, said cover means includes a panel cover plate having a running length extending substantially the distance between two adjacent said upright means, and a knock-out in said cover plate removable to provide an opening surrounding said exposed outlet.

* * * * *